Patented Aug. 9, 1949

2,478,805

UNITED STATES PATENT OFFICE 2,478,805

PROCESS FOR PRODUCING PHENANTHRIDONE

John Mann Butler, Dayton, Ohio, assignor to Monsanto Chemical Company, St. Louis, Mo., a corporation of Delaware No Drawing. Application November 5, 1947, Serial No. 784,297

4 Claims. (Cl. 260—289)

This invention provides a new and improved method for producing phenanthridone.

According to the present invention o-biphenylisocyanate is treated with a Friedel-Crafts catalyst whereupon phenanthridone is obtained in excellent yields. The reaction forming phenanthridone starts immediately upon the mixing together of the o-biphenylisocyanate and the catalyst, and usually with the evolution of some heat.

The product is recovered from the reaction mixture by removal of the catalyst, either by hydrolysis or other means and filtering off the solid phenanthridone. A pure grade of phenanthridone may be obtained from the crude product by solution in a solvent, such as glacial acetic acid or nitro benzene and recrystallization therefrom.

Although the reaction indicated above may be carried out without employing a solvent for the reactants, the use of a suitable solvent or suspension medium aids somewhat in obtaining good yields and also in controlling the heat developed; consequently, its use is preferred. When using a solvent, usually as the reaction proceeds the product comes out of solution, probably in the form of a complex with the catalyst.

The reaction which takes place involves a ring closure which I have found is induced by the action of Friedel-Crafts catalyst.

The reaction which takes place may be written in the following manner:

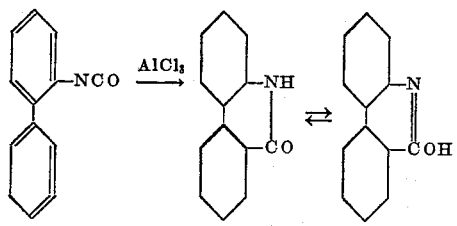

I have found that other Friedel-Crafts type catalysts, such as, HF, $BF_3$, $ZnCl_2$ in addition to aluminum chloride may also be employed.

Any anhydrous solvent which is inert with respect to the reacting constituents may be employed. Suitable solvents are chlorobenzene, o-dichlorobenzene, nitrobenzene, nitromethane, dichloroethylene, etc. The o-biphenylisocyanate may be prepared according to the method described in Journal of the American Chemical Society, vol. 66, page 845.

The reactants are simply mixed together at room temperature, the reaction liberating some heat and generally raising the temperature to 30° to 80° C. Accordingly, generally no heat need be supplied in order to start the reaction. Under certain conditions, however, it may be desirable, and particularly when employing the less active Friedel-Crafts catalyst, to supply a small amount of heat in order to start the reaction. After the reaction has started and heat is evolved, it may be desirable to apply some cooling in order to keep the reaction under control.

In general, quantities of catalyst molecularly equivalent to the amount of o-biphenylisocyanate are used, although larger or smaller quantities may be employed.

The invention is illustrated by the following example:

Example

Put 250 grams o-dichlorobenzene and 37 grams of anhydrous aluminum chloride in a flask provided with a stirrer. 48.8 grams of o-biphenylisocyanate is added slowly to the flask. The temperature rises generally from 30° to 80° C. after about an hour. The solid material suspended in the solvent (probably the $AlCl_3$ complex with the product) is filtered off and this solid hydrolyzed by ice water containing HCl. The solid residue is then washed with alcohol. The product consists of 38 grams (77.6% yield) of phenanthridone. The crude phenanthridone thus recovered is recrystallized from glacial acetic acid. It melts at 292.5° to 293.5° C. Instead of filtering off the $AlCl_3$ complex the suspension in the solvent could be hydrolyzed directly.

Although the invention has been described with respect to specific details thereof, it is not intended that the details set forth shall be construed as limitations upon the scope thereof, except to the extent incorporated in the following claims.

What I claim is:

1. The process which comprises treating o-biphenylisocyanate with a Friedel-Crafts type catalyst and recovering phenanthridone from the reaction product.

2. The process which comprises treating in a solvent, o-biphenylisocyanate with a Friedel-Crafts type catalyst, and recovering phenanthridone from the reaction product.

3. The process which comprises treating a solution of o-biphenylisocyanate in o-dichlorobenzene with $AlCl_3$ and recovering phenanthridone from the reaction product.

4. The process which comprises treating o-biphenylisocyanate with aluminum chloride and recovering phenanthridone from the reaction product.

JOHN MANN BUTLER.

REFERENCES CITED

The following references are of record in the file of this patent:

Pictet et al., Berichte, vol. 29, pp. 1182–1189 (1896).